Patented Oct. 30, 1934

1,978,881

UNITED STATES PATENT OFFICE 1,978,881

ALKALI SALTS OF ADENYL-PYROPHOSPHORIC ACIDS

Carl Ludwig Lautenschlager and Fritz Lindner, Frankfort-on-the-Main, Germany, assignors to Winthrop Chemical Company, Inc., New York, N. Y., a corporation of New York No Drawing. Application February 23, 1933, Serial No. 658,244. In Germany February 27, 1932

5 Claims. (Cl. 260—34)

The present invention relates to alkali metal salts of adenyl-pyrophosphoric acids.

The adenyl-pyrophosphoric acids described in literature, which can be isolated from various kinds of cells and whose chemical structure differs in a small degree according to the parent material used (cf. Lohmann, "Biochemische Zeitschrift" 1931, vol. 233, page 460, especially page 467, and "Science" 1929, vol. II, page 381) show, as is known, a specific physiological action, which consists among others in a reduction of the blood pressure and an increase of the circulation of blood within the cardiac muscle. As far as is known the adenyl-pyrophosphoric acids have hitherto not been used for therapeutical purposes; this obviously for the reason that up to the present date it was thought to be impossible to convert the acids into a stable form suitable for the parenteral application. Hitherto there have only been prepared insoluble or sparingly soluble salts of these acids, such as the silver salts or the salts of the alkaline-earth metals, which cannot be used for therapeutic purposes because they are poisonous or difficultly soluble. Furthermore, it is known that the salts of the alkaline-earth metals of the adenyl-pyrophosphoric acids are liable to decompose (cf. "Biochemische Zeitschrift" 1931, vol. 233, page 460).

Now we have found that the alkali metal salts of the adenyl-pyrophosphoric acids, for instance their sodium, potassium and lithium salts are stable and readily soluble in water. So far as now known, the products have the following probable formula:

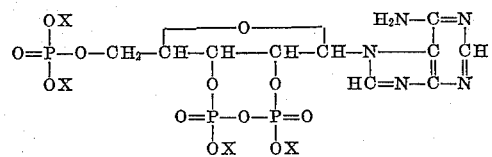

wherein X stands for an alkali metal. The formula could, however, not yet be definitely ascertained.

The alkali metal salts of the adenyl-pyrophosphoric acids can, for instance, be obtained by neutralizing the adenyl-pyrophosphoric acids with a caustic alkali or an alkali metal carbonate or causing a difficultly soluble salt of the adenyl-pyrophosphoric acids to react with a suitable alkali metal salt and in either case carefully evaporating the solution thus obtained or precipitating the alkali metal salt from the solution by the addition of an organic solvent, such as acetone or alcohol. The salts obtained are white, non-hygroscopic water-soluble substances. The salts of the various adenyl-pyrophosphoric acids prepared, for instance, from muscles or yeast, do not differ from one another in their outward appearance. Also the mode of production is the same in each case.

The following examples illustrate the invention:

(1) 5 grams of barium adenyl-pyrophosphate are ground with water in a cooled ball mill and then mixed therein with somewhat more than the quantity of dilute sulfuric acid calculated as equivalent to the barium. The treatment in the constantly cooled ball mill is continued until the transformation is quantitative, the barium sulfate is then separated, the excess of sulfuric acid is cautiously eliminated with barium carbonate, and after neutralizing with caustic soda solution the neutral or feebly acid solution thus obtained is cautiously dried in a vacuum.

In the same manner the potassium salt of the adenyl-pyrophosphoric acid is obtained when a caustic potash solution is used instead of a caustic soda solution.

(2) 5 grams of the calcium salt of the adenyl-pyrophosphoric acid isolated from the cardiac muscles are ground with water and dissolved in a small amount of hydrochloric acid. The quantity of sodium oxalate calculated as equivalent to the calcium is added; the whole is neutralized with caustic soda solution and allowed to stand for a prolonged time whereupon the precipitate is removed by filtration. The filtrate is concentrated in a vacuum to a small volume. By adding alcohol there is obtained in the form of a precipitate the sodium salt of the adenyl-pyrophosphoric acid-compound together with a small quantity of sodium chloride.

If lithium oxalate is added instead of sodium oxalate, there is obtained the lithium salt of the adenyl-pyrophosphoric acid.

(3) The lead compound of the adenyl-pyrophosphoric acid obtained, for instance, by the last purification according to Lohmann "Biochemische Zeitschrift" 1931, vol. 233, page 466, is suspended in water and decomposed with hydrogen sulfide; after filtering the lead sulfide, the filtrate is freed from the hydrogen sulfide, then brought to a feebly acid reaction by addition of caustic soda solution and concentrated to a small volume. By the addition of alcohol the sodium salt of the adenyl-pyrophosphoric acid is precipitated.

We claim:

1. The alkali metal salts of the adenyl-pyrophosphoric acids, said salts being white, non-hygroscopic solid substances, soluble in water.

2. The alkali metal salts of muscle adenyl-pyrophosphoric acids, said salts being white, non-hygroscopic solid substances, soluble in water.

3. The sodium salt of muscle adenyl-pyrophosphoric acid, said salt being a white, non-hygroscopic solid substance, soluble in water.

4. The potassium salt of muscle adenyl-pyrophosphoric acid, said salt being a white, non-hygroscopic solid substance, soluble in water.

5. The lithium salt of muscle adenyl-pyrophosphoric acid, said salt being a white, non-hygroscopic solid substance, soluble in water.

CARL LUDWIG LAUTENSCHLAGER.
FRITZ LINDNER.